(12) United States Patent
Salazar

(10) Patent No.: US 6,622,396 B2
(45) Date of Patent: Sep. 23, 2003

(54) END CLIP FOR MEASURING BLADE/TAPE

(75) Inventor: Christine L. Salazar, Romeoville, IL (US)

(73) Assignee: Keson Industries Inc., Naperville, IL (US)

( * ) Notice: Subject to any disclaimer, the term of this patent is extended or adjusted under 35 U.S.C. 154(b) by 48 days.

(21) Appl. No.: 09/954,085

(22) Filed: Sep. 17, 2001

(65) Prior Publication Data

US 2003/0051365 A1 Mar. 20, 2003

(51) Int. Cl.$^7$ .................................................. G01B 3/10
(52) U.S. Cl. .......................................... 33/758; 33/770
(58) Field of Search ........................ 33/757, 758, 759, 33/770

(56) References Cited

U.S. PATENT DOCUMENTS

| | | | | |
|---|---|---|---|---|
| RE14,947 E | * | 9/1920 | Ballou | 33/770 |
| 1,567,602 A | * | 12/1925 | Keuffel | 33/758 |
| 1,646,826 A | * | 10/1927 | Langsner | 33/758 |
| 1,723,739 A | * | 8/1929 | Langsner | 33/758 |
| 1,726,960 A | * | 9/1929 | Langsner | 33/758 |
| 1,798,476 A | * | 3/1931 | Langsner | 33/758 |
| 1,860,635 A | * | 5/1932 | Thompson | 33/770 |
| 2,629,935 A | * | 2/1953 | Roe | 33/770 |
| 2,778,118 A | * | 1/1957 | Manville | 33/770 |
| 3,611,576 A | * | 10/1971 | Quenot | 33/770 |
| 5,600,894 A | * | 2/1997 | Blackman et al. | 33/758 |
| 6,101,734 A | * | 8/2000 | Ten Caat et al. | 33/770 |

* cited by examiner

Primary Examiner—G. Bradley Bennett
(74) Attorney, Agent, or Firm—Wood, Phillips, Katz, Clark & Mortimer

(57) ABSTRACT

The combination of a flexible blade/tape and a clip. The flexible blade/tape has a length and first and second sides defined by oppositely facing, substantially planar surfaces. The clip has a first tab that projects angularly away from the first surface at the first side of the blade/tape and a second tab that projects angularly away from the second surface at the second side of the blade/tape.

26 Claims, 3 Drawing Sheets

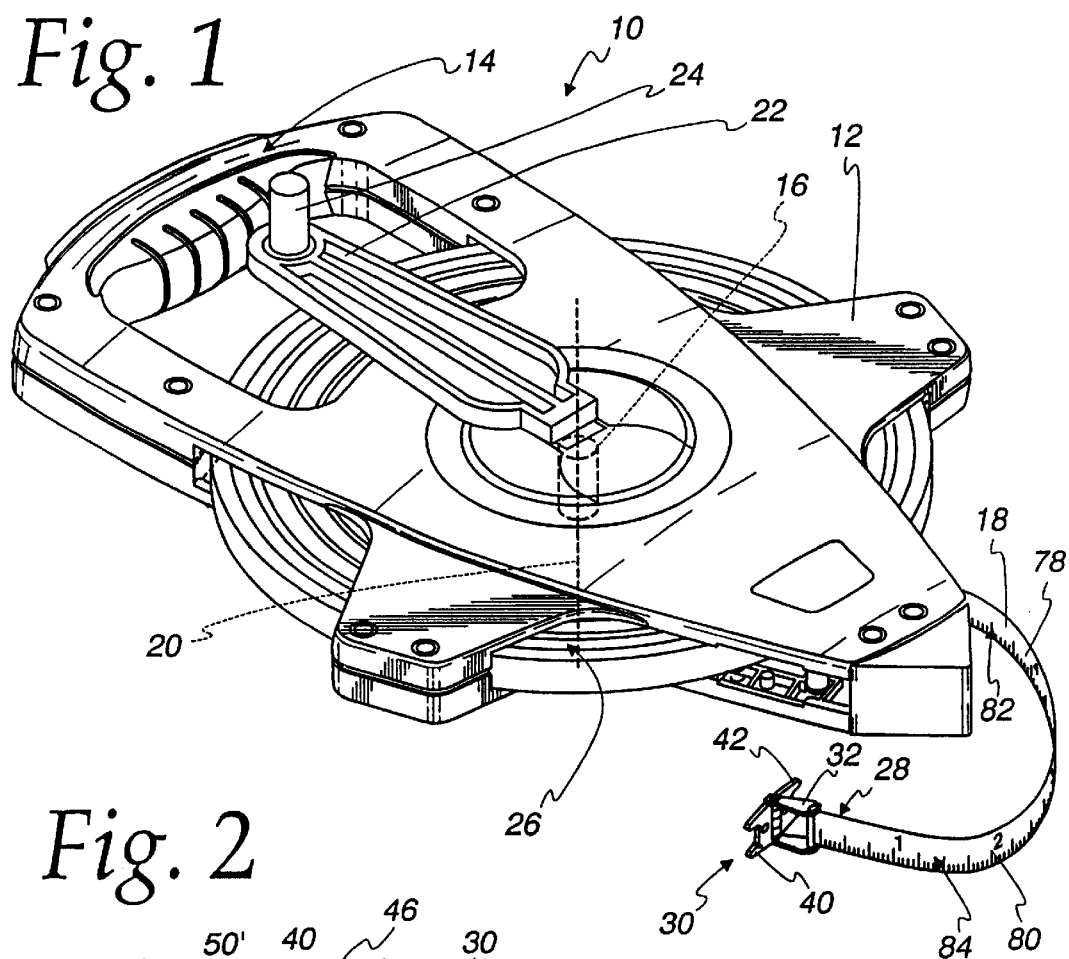
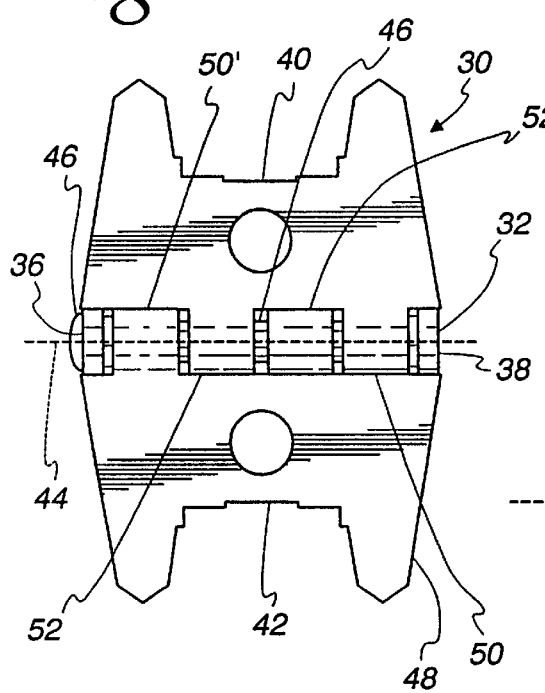
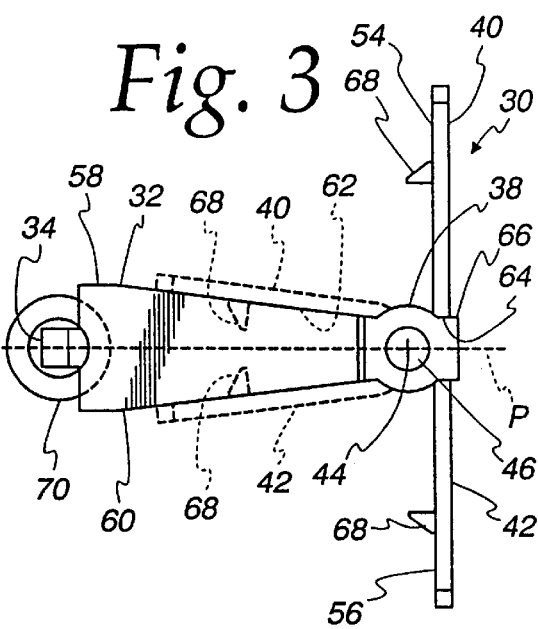

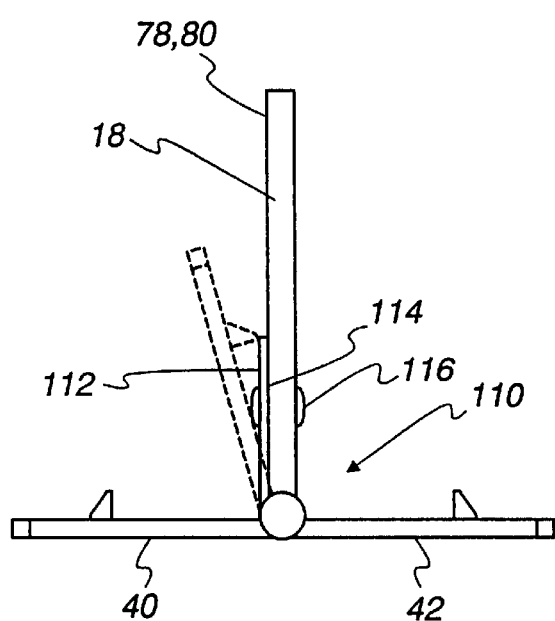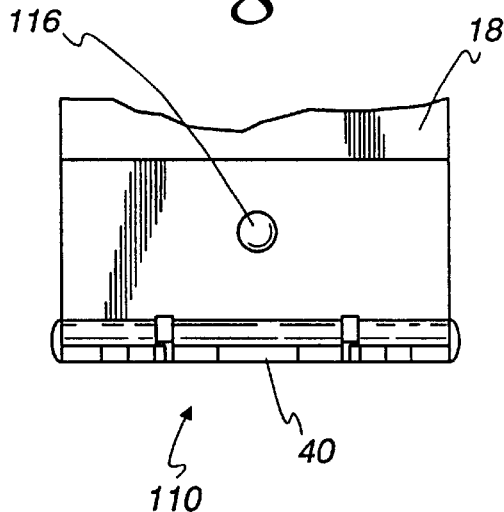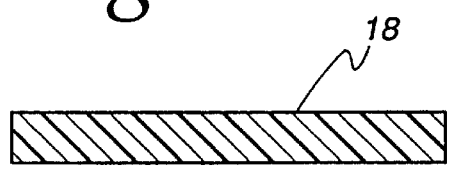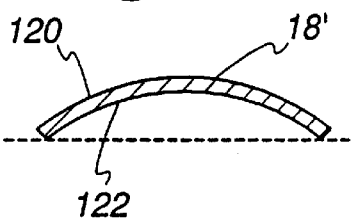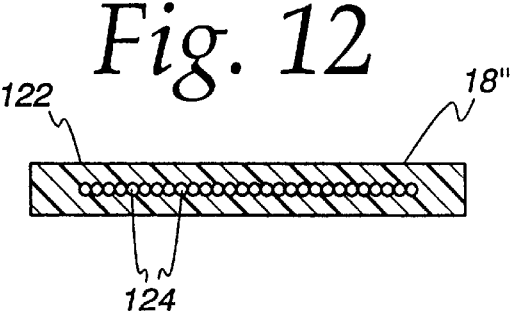

END CLIP FOR MEASURING BLADE/TAPE

BACKGROUND OF THE INVENTION

1. Field of the Invention

This invention relates to flexible measuring blades/tapes and, more particularly, to an end clip on the blade/tape which facilitates positioning of the blade/tape at a location from which a measurement is to be taken.

2. Background Art

Myriad different measuring devices currently employ a flexible blade/tape with markings for measurement on one side thereof. Measuring devices of this type with long blades/tapes commonly employ a non-metallic blade/tape. Conventionally, the blades/tapes are made from nylon, fiberglass, or the like, which is lighter and more pliable than metal blade/tapes to facilitate wrapping retrieval upon a core element.

A clip is secured to the end of the blade/tape and defines the "true zero" location for the measuring device. The clip has a tab which defines a surface that can be borne against an object at a location from which a measurement is to be taken. The tab conventionally has prongs thereon which "dig into" a surface against which the tab is borne to effect positive location thereof. The tab is repositionable relative to the remainder of the clip on the blade/tape between an operative position, wherein it projects from the surface on the side of the blade/tape opposite that which carries the markings, and a stored position wherein the tab is folded towards the tape to be compacted, and also to shield the user from the locating prongs on the tab.

To effect a measurement, the tab on the clip is engaged with an object at a location from which a measurement is to be taken, with the tab in the operative position. The blade/tape is then drawn outwardly. The tab projects from the side of the blade/tape opposite that on which the markings are located so that with the tab engaged, the markings are situated to be clearly viewed by the user.

Designers in this industry are constantly seeking out ways to improve measuring convenience for those using measuring devices.

SUMMARY OF THE INVENTION

In one form, the invention is directed to the combination of a flexible blade/tape and a clip. The flexible blade/tape has a length and first and second sides defined by oppositely facing, substantially planar surfaces. The clip has a first tab that projects angularly away from the first surface at the first side of the blade/tape and a second tab that projects angularly away from the second surface at the second side of the blade/tape.

The clip may be attached to the flexible blade/tape so that the clip is guidingly movable relative to the blade/tape.

The clip may be guidingly movable relative to the blade/tape pivotably around an axis, which axis may extend transversely to the length of the flexible blade/tape.

In one form, the first tab is movable guidingly relative to the blade/tape.

The first tab may be movable guidingly relative to the blade/tape, as around an axis.

The first tab may be movable guidingly relative to the second tab.

In one form, the second tab is movable relative to the first tab.

The flexible blade/tape may be made from a non-metallic material.

In one form, there are measurement markings on each of the first and second oppositely facing surfaces of the blade/tape.

The combination may further include a core around which the flexible blade/tape is wrapped.

The combination may further include a housing defining a receptacle for the blade/tape wrapped around the core.

The invention is also directed to a clip for attachment to a flexible, substantially flat blade/tape. The clip has a connector through which the clip can be secured to a flexible blade/tape so that the connector projects in a reference plane substantially parallel to, and between, oppositely facing flat surfaces on a blade/tape to which the clip is secured. The reference plane has oppositely facing first and second sides. A first tab projects angularly away from the first side of the reference plane with a second tab projecting angularly away from the second side of the reference plane.

The first tab may be guidingly movable relative to the connector.

In one form, the second tab is guidingly movable relative to the connector.

The second tab may be guidingly movable relative to the first tab.

In one form, the first tab, second tab, and connector are guidingly movable, each relative to the other, around a first pivot axis.

In one form, the connector has an elongate bar spaced from the first axis, which elongate bar has a length extending generally parallel to the first axis.

The first tab may have at least one prong thereon projecting in cantilever fashion therefrom.

In one form, the connector has a shoulder for abutting the first tab to thereby limit relative movement between the connector and first tab.

BRIEF DESCRIPTION OF THE DRAWINGS

FIG. 1 is a perspective view of a measuring device, according to the present invention, and having a case/housing for a blade/tape which is shown drawn partially outwardly from the case/housing and which has a clip on the end thereof, made according to the present invention;

FIG. 2 is an enlarged, end elevation view of the clip on the measuring device in FIG. 1 and showing first and second tabs thereon moved outwardly relative to a connector to an operative position;

FIG. 3 is an enlarged, side elevation view of the inventive clip in the FIG. 2 state;

FIG. 8 is a fragmentary, side elevation view of a modified form of clip, according to the present invention, attached to a blade/tape, and in the state corresponding to that shown in FIG. 3;

FIG. 9 is a fragmentary, plan view of the clip in FIG. 8 and in the same state as shown in FIG. 8;

FIG. 10 is a cross-sectional view of one form of blade/tape, according to the present invention;

FIG. 11 is a view as in FIG. 10 of a modified form of blade/tape;

FIG. 12 is a view as in FIG. 10 of a further modified form of blade/tape;

FIG. 13 is a view as in FIG. 10 of a still further modified form of blade/tape;

DETAILED DESCRIPTION OF THE DRAWINGS

Figure 4:
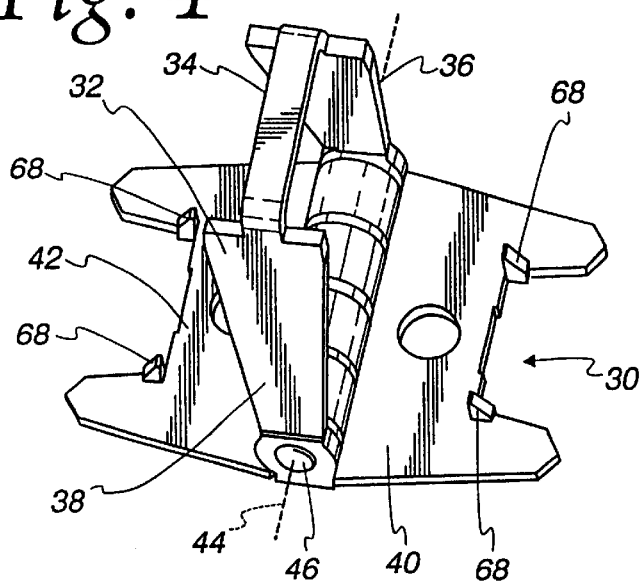
FIG. 4 is an enlarged, perspective view of the inventive clip in the state shown in FIGS. 2 and 3.
Figure 5:
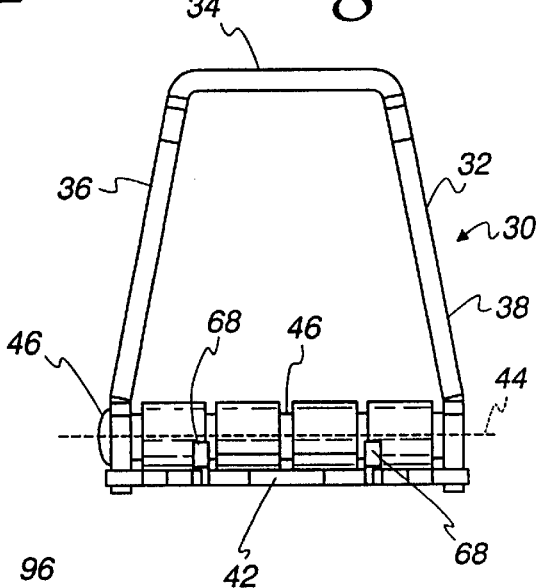
FIG. 5 is an enlarged, bottom view of the inventive clip in the state shown in FIGS. 2–4.

Referring initially to FIG. 1, one form of measuring device, according to the present invention, is shown at 10. The measuring device 10 consists of a case/housing 12 with a graspable handle 14. The case/housing 12 has a core element 16 which is connectable to an end of a flexible blade/tape 18. The core element 16 is rotatable about an axis 20 through an operating arm 22 to wrappingly retrieve paid out lengths of the blade/tape 18. A grippable knob 24 on the operating arm 22 facilitates its rotation. The retrieved and accumulated blade/tape 18 resides in a storage space 26 defined by the case/housing 12.

The blade/tape 18 has a free end at 28 to which a clip at 30, according to the present invention, is attached. Details of one form of the inventive clip 30 are shown in FIGS. 2–5, taken in conjunction with FIG. 1. The clip 30 consists of a U-shaped connector 32 with a base 34, in the form of an elongate bar, and spaced legs 36, 38 projecting in a diverging manner from the base 34.

The connector 32 is joined to first and second tabs 40, 42. The connector 32, first tab 40, and second tab 42 are joined so as to be pivotable, each relative to the other, about a common axis 44. Pivoting connection is established by a pivot pin 46. It should be understood that the connection to pivot the first and second tabs 40, 42 and connector 32 relative to each other about the same axis is a convenience. There is no need to have a common pivot axis.

The tabs 40,42 have the same construction. The exemplary first tab 40, which may be made from formed metal, has a flat wall 48, which terminates at spaced knuckles 50, 52, each of which is journalled for rotation relative to the pivot pin 46, which extends therethrough. The second tab 42 has corresponding knuckles 50', 52'. The first and second tabs 40, 42 are joined by reversely orienting the first and second tabs 40, 42 so that the knuckles 50, 52, 50', 52' can be meshed to allow the pivot pin 46 to be directed therethrough. The pivot pin 46 has a length sufficient to also extend through the legs 36, 38 and the connector 32, which straddles the meshed knuckles 50, 52, 50' 52'.

With this arrangement, the first and second tabs 40, 42 are pivotable between an operative position, shown in solid lines in FIG. 3, and a collapsed, storage position, shown in dotted lines in that same figure. In the operative position, the tabs 40, 42 have exposed surfaces 54, 56, which can be borne against an object at a location from which a measurement is to be taken. The clip 30 can be selectively positioned so that the object nests in a receptacle at the juncture between the surface 54 and one edge 58 of the connector 32, or in a receptacle at the juncture between the surface 56 of the second tab 42 and the opposite edge 60 of the connector 32. With the clip 30 located in either position relative to an object, the clip 30 establishes the "true zero" location for the measuring device 10.

The tab 40 has an edge 62 which abuts to the connector edge 58 with the tab 40 in the collapsed, storage position, shown in dotted lines. To limit pivoting movement of the tab 40, and consistently maintain the tab 40 in the operative position, edges 64 (one shown) on the tab 40 abut, one each, to shoulders 66 on the connector 32.

To facilitate maintenance of the clip 30 in a desired position relative to the object from which a measurement is to be made, prongs 68 project in cantilever fashion from the surfaces 54, 56 of the tabs 40, 42. At least one, and in this case two, such prongs 68 project from each tab 40, 42. The prongs "dig into" a surface against which the prongs are drawn.

Figure 6:
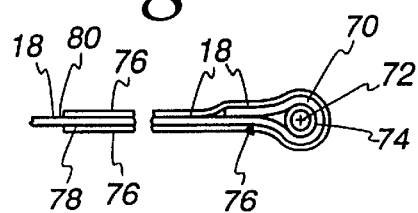
FIG. 6 is an enlarged, fragmentary, plan view of a connecting sleeve at the end of the blade/tape which is joined to the inventive clip.

The clip 30 is joined to the blade/tape 18. The structure through which this is accomplished is shown most clearly in FIGS. 3 and 6. To effect this connection, a cylindrical sleeve 70 surrounds the base 34 and resides between the connector legs 36, 38. The sleeve 70 and base 34 are thus relatively pivotable about the length of the base, which is indicated by the axis 72. The blade/tape 18 is wrapped around the outer surface 74 of the sleeve 70 and doubled back on itself and secured, as by an adhesive at 76. The blade/tape 18 can be adhered to the outer surface 74 of the sleeve 70 as well as to itself. To make this connection more secure, a flexible reinforcing strip 76 overlies the free end 28 of the blade/tape at one side surface 78 and extends continuously around the sleeve 70 and over the other, oppositely facing blade/tape surface 80. The reinforcing strip 76 can be adhered to the blade/tape 18 over the entire region which it overlies.

As seen in FIG. 3, the clip 30, with the tabs 40, 42 in the operative position therefor, cooperatively defines a T shape with a reference plane P that is substantially parallel to the substantially flat, oppositely facing blade/tape surfaces 78, 80. The connector 32 projects in the reference plane P. By collapsing the second tab 42, the object, from which a measurement is to be taken, can be nested in a receptacle defined at the juncture between the first tab 40 and clip connector edge 58. This exposes the surface 78 of the blade/tape 18 to be readily viewed by the user. In this embodiment, the surface 78 has measurement markings 82 thereon along its length. By collapsing the first tab 40 and utilizing the second tab 42 to connect the blade/tape 18 to an object, the surface 80 of the blade/tape 18 is exposed. The surface 80 likewise has measurement markings 84 along its length.

With this arrangement, the user has the option of readily selectively visually accessing the markings 82, 84 on either side of the blade/tape 18. The markings 82, 84 can be different on each side. As just examples, the scale may be different for the markings 82, 84 or the markings 82, 84 on the opposite sides may be related to different systems, i.e. metric versus English. As a further alternative, the sides 78, 80 can have different colors for different visibility in different conditions and different lighting.

Figure 7:
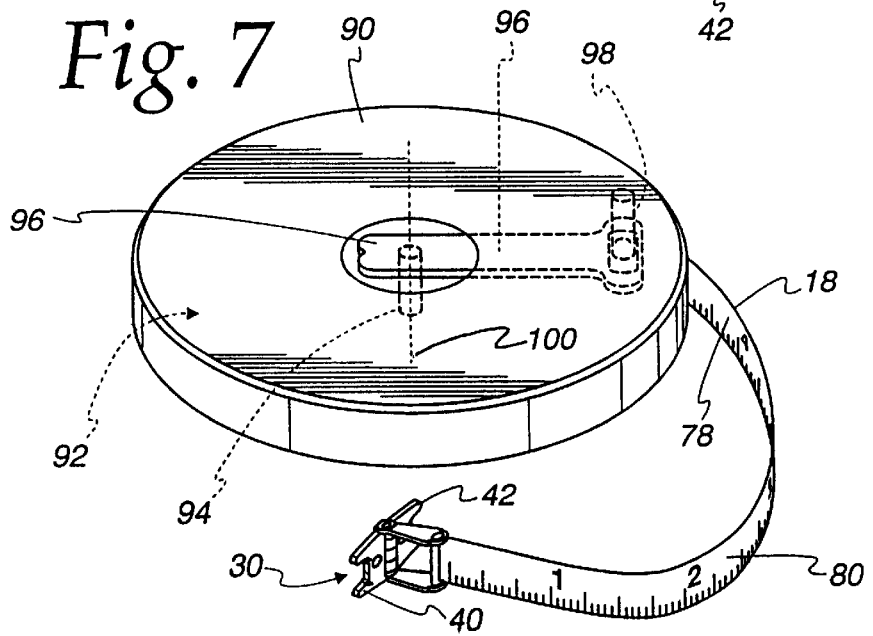
FIG. 7 is a perspective view of a modified form of case/housing, made according to the present invention, and with a portion of a blade/tape drawn therefrom and having a clip, according to the present invention, thereon.

The invention contemplates variations from the structure described above. As just examples, as shown in FIG. 7, a different form of case/housing is shown at 90. The case/housing 90 is disk-shaped to define an enclosed cylindrical storage space 92 for the blade/tape 18. The blade/tape 18 is wrapped around a core element 94. Rotation of the core element 94 is facilitated by an operating arm 96 which can be selectively placed in an operating position, as shown in dotted lines, and a stored position, as shown in solid lines. The operating arm 96 has a graspable knob 98 that can be engaged and manipulated by a user to rotate the arm 96, and thus the core element 94, around an axis 100.

A further modification of the invention is shown in FIGS. 8 and 9. In FIGS. 8 and 9, a clip 110 is shown, which incorporates first and second tabs 40, 42, as previously described. This embodiment varies from that, previously described, in that a modified connector 112, corresponding to the connector 32, is joined to the mated first and second tabs 40, 42 in place of the connector 32. The connector 112 has a surface 114 that is abutted to one of the surfaces 78, 80 of the blade/tape 18 and secured thereto through a fastener 116, which may be in the form of a rivet.

Throughout, the blade/tape 18 has been described as flat with substantially planar, oppositely facing surfaces 78, 80. It should be understood that "substantially planar" is not limited to describing a blade/tape with perfectly flat and parallel, oppositely facing surfaces. As shown in FIG. 10, it is known to use a blade/tape 18' made of metal, or the like, which has a bowed configuration. The oppositely facing surfaces 120, 122, corresponding to the surfaces 78, 80, are considered, for purposes of this disclosure, substantially planar.

As shown in FIG. 11, the blade/tape 18 is preferably made from a non-metallic material, although it can be made from metal, as shown, for example, in FIG. 10. In FIG. 11, the blade/tape 18 can be made from a material such as nylon or fiberglass.

In FIG. 12, a modified form of blade/tape 18" is shown consisting of a non-metallic substrate 122 within which fibers or cords 124 are embedded. The fibers/cords 124 resist elongation of the blade/tape 18".

In FIG. 13, the blade/tape 18''' is shown to be made from a flat piece of metal, as opposed to the bowed configuration shown in FIG. 10.

The foregoing disclosure of specific embodiments is intended to be illustrative of the broad concepts comprehended by the invention.

What is claimed is:

1. In combination:
   a flexible blade/tape having a length and first and second sides defined by oppositely facing substantially planar surfaces; and
   a clip attached to the flexible blade/tape, the clip comprising:
   i) a first tab that projects angularly away from the first surface at the first side of the blade/tape and having a first projecting prong; and
   ii) a second tab that projects angularly away from the second surface at the second side of the blade/tape and having a second projecting prong,
   the first and second tabs changeable selectively from an operative position into a stored position wherein the first and second tabs abut to first and second edges on the clip and the first and second prongs project towards but not past each other.

2. The combination according to claim 1 wherein the clip is attached to the flexible blade/tape so that the clip is guidingly movable relative to the blade/tape.

3. The combination according to claim 2 wherein the clip is guidingly movable relative to the blade/tape pivotably around an axis.

4. The combination according to claim 3 wherein the axis extends transversely to the length of the flexible blade/tape.

5. The combination according to claim 1 wherein the first tab is movable guidingly relative to the blade/tape.

6. The combination according to claim 5 wherein the first tab is movable guidingly relative to the blade/tape pivotably around an axis.

7. The combination according to claim 5 wherein the first tab is movable guidingly relative to the second tab.

8. The combination according to claim 1 wherein the second tab is movable relative to the first tab.

9. The combination according to claim 1 wherein the flexible blade/tape comprises a non-metallic material.

10. The combination according to claim 1 wherein there are measurement markings on each of the oppositely facing planar surfaces.

11. The combination according to claim 1 further comprising a core element around which the flexible blade/tape is wrapped.

12. The combination according to claim 11 further comprising a casing/housing defining a receptacle for the blade/tape wrapped around the core element.

13. The combination according to claim 1 wherein the first and second tabs have meshed knuckles which guide relative pivoting movement of the first and second tabs between the stored and operative positions.

14. The combination according to claim 1 wherein the first and second tabs have the same construction.

15. A clip for attachment to a flexible, substantially flat blade/tape, the clip comprising:
   a connector through which the clip can be secured to a flexible blade/tape so that the connector projects in a reference plane substantially parallel to and between oppositely facing flat surfaces on a blade/tape to which the clip is secured, the reference plane having oppositely facing first and second sides;
   a first tab that projects angularly away from the first side of the reference plane and having a first projecting prong; and
   a second tab that projects angularly away from the second side of the reference plane and having a second projecting prong,
   the first and second tabs changeable selectively from an operative position into a stored position wherein the first and second prongs project towards but not past each other.

16. The clip for attachment to a flexible blade/tape according to claim 15 wherein the first tab is guidingly movable relative to the connector.

17. The clip for attachment to a flexible blade/tape according to claim 15 wherein the second tab is guidingly movable relative to the connector.

18. The clip for attachment to a flexible blade/tape according to claim 15 wherein the second tab is guidingly movable relative to the first tab.

19. The clip for attachment to a flexible blade/tape according to claim 15 wherein the first tab, second tab and connector are guidingly movable, each relative to the other, around a first pivot axis.

20. The clip for attachment to a flexible blade/tape according to claim 19 wherein the connector comprises an elongate, bar spaced from the first axis and having a length extending generally parallel to the first axis.

21. The clip for attachment to a flexible blade/tape according to claim 15 wherein the first tab has at least one prong thereon and projecting in cantilever fashion.

22. The clip for attachment to a flexible blade/tape according to claim 15 wherein the connector has a shoulder for abutting the first tab to thereby limit relative movement between the connector and first tab.

23. The combination according to claim 15 wherein the first and second tabs have meshed knuckles which guide relative pivoting movement of the first and second tabs between the stored and operative positions.

24. The combination according to claim 15 wherein the first and second tabs have the same construction.

25. In combination:

a flexible blade/tape having a length and first and second sides defined by oppositely facing substantially planar surfaces; and a clip attached to the flexible blade/tape, the clip comprising:
  i) a first tab that projects angularly away from the first surface at the first side of the blade/tape and having a first projecting prong; and
  ii) a second tab that projects angularly away from the second surface at the second side of the blade/tape and having a second projecting prong, the first and second tabs changeable selectively from an operative position into a stored position wherein the first and second tabs abut to first and second edges on the clip and the first prong projects towards the second tab but not past the second tab so that the first prong is not exposed past the second tab.

26. The combination according to claim 25 wherein as the first and second tabs are changed from the operative position into the stored position, the second tab projects towards the first tab but not past the first tab so that the second prong is not exposed past the first tab.

* * * * *